US006630218B1

(12) United States Patent
Abe

(10) Patent No.: US 6,630,218 B1
(45) Date of Patent: Oct. 7, 2003

(54) ADHESIVE SHEET AND METHOD FOR PRODUCING THE SAME

(75) Inventor: Hidetoshi Abe, Tendo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/554,973

(22) PCT Filed: Dec. 31, 1998

(86) PCT No.: PCT/US98/27875

§ 371 (c)(1),
(2), (4) Date: May 23, 2000

(87) PCT Pub. No.: WO99/35201

PCT Pub. Date: Jul. 15, 1999

(51) Int. Cl.[7] .............................. B32B 9/00; B32B 33/00
(52) U.S. Cl. ..................... 428/40.1; 428/40.2; 428/143; 428/147; 428/158; 428/159; 428/192; 428/215; 428/317.3; 428/343; 428/354; 428/356; 428/402
(58) Field of Search ................................ 428/40.1, 143, 428/147, 158, 159, 215, 228, 317.3, 343, 354–356, 402, 40.2

(56) References Cited

U.S. PATENT DOCUMENTS

| 4,077,926 A | * | 3/1978 | Sanderson et al. | ......... 260/29.6 |
|---|---|---|---|---|
| 4,113,792 A | | 9/1978 | Pastor et al. | ................. 260/834 |
| 4,170,612 A | | 10/1979 | Pastor et al. | ................. 525/101 |
| 4,994,322 A | * | 2/1991 | Delgado et al. | ............ 428/343 |
| 5,157,101 A | | 10/1992 | Orr | ........................... 528/74.5 |
| 5,268,228 A | * | 12/1993 | Orr | ........................... 428/343 |
| 5,650,215 A | * | 7/1997 | Mazurek et al. | ............ 428/156 |
| 6,197,397 B1 | * | 3/2001 | Sher et al. | ................. 428/42.3 |

FOREIGN PATENT DOCUMENTS

| EP | 0 279 579 B1 | | 8/1988 | ............... C09J/7/04 |
|---|---|---|---|---|
| JP | 3-67043 | | 6/1991 | ............... C09J/7/02 |
| WO | WO 94/00525 | * | 1/1994 | |
| WO | WO 97/20008 | | 5/1997 | ............... C09J/7/02 |
| WO | WO 97/20008 | * | 6/1997 | |
| WO | WO 98/29516 | | 9/1998 | ............... C09J/7/02 |

* cited by examiner

Primary Examiner—Harold Pyon
Assistant Examiner—Brian P. Egan
(74) Attorney, Agent, or Firm—Carolyn V. Peters

(57) ABSTRACT

An adhesive sheet containing a flexible substrate film; an adhesive layer in contact with a main surface of the substrate film; and a liner is disclosed. The adhesive layer has an uneven surface structure with a plurality of projections extending from the surface and grooves surrounding the projections. The liner has a corresponding, mating surface in contact with the uneven surface of the adhesive layer. A method of making the adhesive sheet is also disclosed.

28 Claims, No Drawings

ADHESIVE SHEET AND METHOD FOR PRODUCING THE SAME

FIELD OF THE INVENTION

The present invention relates to an improvement of an adhesive sheet which has a specific uneven structure oh its adhesive surface, and can be adhered to an adherent without trapping unnecessary air between the adhesive surface and the surface of the adherent.

BACKGROUND OF THE INVENTION

Adhesive sheets are known, which can be bonded or adhered to adherents without trapping unnecessary air between the adhesive surface and the surface of the adherent.

An example of such an adhesive sheet (including an adhesive film) comprises a substrate film and an adhesive layer which is in contact with at least one of the main surfaces of the substrate film, and which has an regularly patterned uneven structure comprising (i) a plurality of projections which will be in contact with an adherent and (ii) grooves which are formed between adjacent projections and will communicate outside when the projections are in contact with the adherent.

This type of the adhesive sheet can allow the trapped air bubbles to escape outside when the adhesive sheet is in contact with an adherent. Thus, the adhesive sheet can be successfully adhered to the adherent without trapping air between the adhesive surface of the sheet and the surface of the adherent.

Such adhesive sheets comprising adhesive layers having such an uneven structure described above are disclosed in, for example, Japanese Patent Publication JP-U (utility model)-3-67043-A.

A conventional method for producing an adhesive sheet will be briefly explained.

First, a liner, an adhesive layer and a substrate film are laminated in this order to provide a laminate comprising these three layers.

Next, an embossing tool is pressed on the liner side of the laminate, and the laminate is processed so that a specific uneven structure is formed on the adhesive layer (adhesive surface). Therefore, the liner is made of a material which can be plastically deformed by above embossing, such as a resin film.

The substrate film of the usual adhesive sheet is also plastically deformed by above embossing, since it comprises a resin film. Thus, embossing marks remain on the main surface of the substrate film on which no adhesive layer is formed, and the appearance of the adhesive sheet deteriorates.

It is also known that a negative structure corresponding to a structure, which will be formed on the surface of an adhesive surface is formed on the surface of a liner. A liquid containing an adhesive polymer is applied on the structural surface of the liner and solidified to form a laminate consisting of the liner and solidified adhesive layer, and then a resin substrate film is laminated on the surface of the adhesive layer to form an adhesive sheet (see, for example, U.S. Pat. No. 5,650,215 (Mazurek et al.)). In this method, the liner and adhesive layer are laminated so that the positive structure on the adhesive surface and the negative structure of the liner are in contact with each other. In this case, no embossing marks remain on the main surface.

However, none of the above prior art teach that the adhesive layers of the adhesive sheets having the uneven structure contain elastic microspheres.

SUMMARY OF THE INVENTION

As described above, the adhesive sheets are known, which have no embossing marks on the main surface of the substrate film which is not in contact with the adhesive layer, and which can effectively prevent the deterioration of appearance.

However, with such an adhesive sheet, the uneven structure of the adhesive layer (i.e., adhesive surface) remains after the adhesion of the adhesive sheet to the adherent, and thus the shape of the uneven structure appears on the surface of the substrate film. Therefore, it is difficult to prevent the deterioration of the appearance of the adhesive sheet after the adhesion to the adherent. In particular, with the flexible substrate film, depressions are formed in areas of the substrate film corresponding to the depressed portions of the adhesive layer, when the adhesive sheet are adhered to the adherent, and such depressed portions remain for a relatively long time after the completion of the adhesion.

Thus, an aspect of the present invention provides an adhesive sheet which can maintain a specific uneven structure just after adhesion to an adherent so that bubbles can effectively escape even when the bubbles are trapped, and thereafter, the uneven structure deforms so that deterioration of the appearance can be prevented after adhesion.

The present invention provides an adhesive sheet comprising (a) a flexible substrate film;

(b) an adhesive layer which is in contact with at least one of the main surfaces of said flexible substrate sheet, and which has an uneven structure comprising (i) a plurality of projections which will be in contact with an adherent and (ii) grooves which are formed between adjacent projections and will communicate outside when said plurality of projections are in contact with the adherent; and (c) a liner which has, on at least one of its surfaces, a negative structure corresponding to said uneven structure of the adhesive layer, and is laminated on said adhesive layer so that said negative structure and said uneven structure on the surface of the adhesive layer are in contact with each other.

Preferably, in one embodiment, the adhesive layer comprises a crosslinked polymer, and maintains said uneven structure having an initial contact area just after the adhesive sheet is adhered to the adherent. Said uneven structure deforms to form an increased contact area of at least 92% after 48 hours at 25° C. from the adhesion of the sheet to the adherent. In a second embodiment, said adhesive layer comprises a matrix component containing an adhesive polymer and elastic microspheres, which are dispersed in said matrix component. The elastic microspheres have an average diameter of 10 to 100 μm as described below.

Further embodiments are disclosed below.

EMBODIMENTS OF THE INVENTION

Adhesive Sheet of One Embodiment

The adhesive sheet of the first embodiment according to the present invention has the following characteristics:

(a) the adhesive layer contains a crosslinked polymer, and (b) the adhesive sheet maintains-an uneven structure just after a liner is peeled off and the adhesive sheet is adhered to the adherent. The uneven structure deforms and thus a contact area increases to at least 92% after 48 hours at 25° C. from the adhesion of the sheet to the adherent.

The above characteristic (b) is easily achieved due to the shape memory of the adhesive layer containing the crosslinked polymer. That is, such a characteristic is obtained by allowing the adhesive layer to memorize a flat shape having no uneven structure as the first shape, and then shaping the adhesive sheet to impart the specific uneven structure as the second shape to the adhesive layer. The easy and effective method for forming such an adhesive sheet will be explained below. In this case, the above liner, that is, the liner which has, on at least one of its surfaces, the negative structure corresponding to the uneven structure of the adhesive layer, and is laminated on the adhesive layer so that the negative structure and the uneven structure on the surface of the adhesive layer are in contact with each other, functions as a negative mold for imparting the above second shape (positive shape), and also as a protective film for maintaining the second shape of the adhesive layer during storage (before use).

The adhesive layer contains an adhesive polymer, and has tackiness at room temperature (about 25° C.). The crosslinked polymer may be the above adhesive polymer which has been crosslinked, or a separately added non-adhesive crosslinked polymer.

The polymer is usually crosslinked with a crosslinking agent. The amounts of the components are suitably selected in a range in which the adhesion force of the adhesive layer is not lower than a specified level, and the uneven structure deforms within a specific period of time so that the contact area increases to 92% or larger. For example, the adhesive layer may be formed from a liquid (coating composition) for the adhesive layer containing 0.01 to 5 wt. parts of the crosslinking agent per 100 parts of the adhesive polymer contained in the adhesive layer.

To accelerate the crosslinking of the polymer, an energy such as heat and radiation can be preferably used. The polymer can be crosslinked by directly reacting reactive sites of the polymer chains.

Adhesive Sheet of Another Embodiment

In the adhesive sheet of the second embodiment, the adhesive layer comprises (1) a matrix component containing an adhesive polymer and (2) elastic microspheres dispersed in the matrix component, wherein the elastic microspheres have an average diameter of 10 to 100 $\mu$m.

The elastic microspheres assist in the recovery of the original shape of the adhesive layer after the adhesive layer is deformed from the originally imparted shape. For example, when the adhesive sheet is produced by forming an adhesive layer on a structural surface of a liner by the application and drying of the liquid for the adhesive layer, and then laminating a substrate film, an adhesive layer is formed, which has (i) an uneven structure corresponding to the structural surface of the liner on the adhesive surface and (ii) a flat surface which is in contact with the substrate film. When such an adhesive sheet is adhered to an adherent and then pressed from the substrate film side against the adherent, the adhesive layer deforms, and depressed portions are formed on the surface of the substrate film at areas corresponding to the depressed portions of the adhesive layer (i.e., on the liner side of the adhesive surface). However, the deformation of the adhesive layer is accompanied with the elastic deformation of the elastic microspheres, and thus, the adhesive layer recovers the original shape because of the shape recovering function of the elastic microspheres.

Such a shape recovery effect can be expected when the adhesive sheet is produced by the following method. The method comprises the following steps:

(1) a layer of an adhesive agent having a substantially flat adhesive surface is formed on at least one surface of a substrate film, wherein the adhesive agent comprises a matrix component containing an adhesive polymer and elastic microspheres dispersed in the matrix component, and (2) the adhesive surface of the adhesive agent layer and a structural surface of a liner corresponding to a negative uneven structure are allowed in contact with each other to form an adhesive layer having a positive uneven structure corresponding to the negative structure of the liner.

This method can produce an adhesive sheet, which effectively and easily prevents deterioration of the appearance of the adhesive sheet after adhesion.

Source of Uneven Structure

The uneven structure of the adhesive layer is not limited, insofar as the effects of the present invention are not impaired.

The uneven structure comprises projections each having a horizontal cross-sectional area (i.e., a cross-section in parallel with the adhesive surface) having a polygonal (e.g. square), round or similar shape, and grooves, which are continuously formed to surround the projections.

The shape of a vertical section of each projection may be square such as trapezoidal or rectangular, semicircular or the like.

The height of the projections (and the depth of the groove) is usually between 5 and 200 $\mu$m, preferably between 10 and 100 $\mu$m. When the height of the projections is too low, it may be difficult to remove bubbles trapped between the adhesive surface and adherent surface. When the height of the projections is too high, the appearance of the adhesive sheet may be impaired after the completion of the adhesion.

The maximum width of the projections (i.e., the maximum size in the horizontal direction) is usually between 0.1 and 10 mm. The maximum width of the groove (i.e., the maximum distance between adjacent projections) is usually between 0.05 and 1 mm.

The projections are preferably arranged uniformly. For example, each projection is placed substantially at the center of each square of a check pattern. In this case, the grooves are formed along the lines constituting the check pattern, and have one or more openings so that at least one groove, preferably a plurality of grooves can communicate with the outside.

The sizes of a plurality of projections and grooves are preferably all the same.

Elastic Microspheres

Herein, the term "elastic microsphere", which may be referred to as simply "microsphere", is intended to mean a material, which exhibits rubbery elasticity as a whole.

The average diameter of the microspheres is usually between 10 and 100 $\mu$m, preferably between 20 and 80 $\mu$m. When the average diameter is less than 10 $\mu$m, the above shape recovery effect is not attained. When the average diameter exceeds 100 $\mu$m, the unevenness due to the presence of the microspheres may be recognized from the surface of the substrate film.

The average diameter is derived by measuring diameters of 1000 microspheres using an image analyzer with an optical microscope and calculating an average value according to the following equation (1):

$$\text{average diameter } (\mu m) = \Sigma(d_i^4 \times n_i)/\Sigma(d_i^3 \times n_i) \tag{1}$$

wherein $d_i$ is a diameter ($\mu$m) of a microsphere having an i-th largest diameter, and $n_i$ is the number of microspheres having the diameter $d_i$.

The microsphere may be solid or hollow having at least one void therein.

The microspheres preferably comprise polyacrylate (acrylic copolymer), since its rubbery elasticity and tackiness are easily controlled.

The compressive modulus of the microspheres is preferably between $1 \times 10^4$ and $1 \times 10^6$ dyne/cm$^2$. In this range, the shape recovery effect of the microspheres is good.

The compressive modulus is measured using a RSA II viscoelastic spectrometer (manufactured by RHEOMETRIX) at 20° C. That is, the temperature dependency of the modulus is measured by changing a temperature from −80° C. to 150° C. while applying a compression strain having a frequency of 1 rad/sec. A measured value at 20° C. is used as the compressive modulus.

The microspheres may be tacky or non-tacky. In general, the microspheres contain a crosslinked polymer.

Method for Producing Elastic Microspheres

The elastic microspheres may be produced by any known method such as suspension polymerization, emulsion polymerization, seed polymerization, and the like. A method for producing polyacrylate microspheres by emulsion polymerization will be briefly explained by way of example.

In a reactor equipped with a mechanical stirrer, deionized water, an acrylic monomer, a radical polymerization initiator, and other optional additives are added, and the interior of the reactor is purged with an inert gas. Then, the reactor is heated to a specific temperature to initiate polymerization of the monomer while stirring. In general, the stirring rate is from 10 to 700 rpm, and the reaction temperature is from 30 to 120° C. The reaction time is usually from several hours to ten hours.

As the acrylic monomer, a mixture of an alkyl acrylate (e.g. isooctyl acrylate, 2-ethylhexyl acrylate, isononyl acrylate, etc.) and an acrylic unsaturated acid (e.g. acrylic acid, methacrylic acid, itaconic acid, maleic acid, etc.) may be used. A weight ratio of the alkyl acrylate to the acrylic unsaturated acid is preferably from 99:1 to 90:10. When the amount of the alkyl acrylate is too small, the tackiness is lowered. When the amount of the alkyl acrylate is too large, the rubbery elasticity decreases. In either case, the adhesion force to the uneven surface tends to decrease. It is possible to crosslink the polyacrylate by the addition of a crosslinking agent comprising a bifunctional acrylate such as divinyl benzene 1,4-dibutyl-2-diacrylate to the above mixture.

The production method of the polyacrylate microspheres is disclosed in, for example, U.S. Pat. No. 4,994,322.

The produced microspheres are usually recovered by filtration and used. An aqueous dispersion containing the microspheres following the reaction may also be used. The tacky polymer is added to the dispersion to obtain the adhesive coating composition.

Adhesive Polymer

The term "adhesive polymer" used herein means a polymer, which exhibits adhesion at room temperature and can be used as a pressure sensitive adhesive. Polyacrylate, polyurethane, polyolefin, polyester, and the like can be used as such a polymer. A tackifier may be used in combination with the adhesive polymer, as in the case of conventional pressure sensitive adhesives. The adhesive polymer may be a polymer, which can be cured with heat or radiation after the uneven structure of the adhesive layer deforms and the appearance of the adhesive sheet is improved insofar as the effects of the present invention are not impaired.

The molecular weight of the adhesive polymer may be in a range in which the desired viscosity is achieved. In general, the weight average molecular weight of the adhesive polymer is between 10,000 and 100,000.

The adhesive polymer can be used in the form of a solution (in which the polymer is dissolved in a solvent) or an emulsion (in which the polymer is dispersed in a solvent). The solution and emulsion may be used in admixture.

When the adhesive polymer is crosslinked, a crosslinking agent comprising an isocyanate compound, a melamine compound, a poly(meth)acrylate compound, an epoxy compound, an amide compound, and the like can be added. When the adhesive layer contains a non-adhesive polymer, the polymers can be crosslinked with such a crosslinking agent.

Adhesive Layer

In either the first or second embodiment, the thickness of the adhesive layer is not limited insofar as the effects of the present invention are not impaired, and is usually between 10 and 200 $\mu$m.

In the second embodiment, the amounts of the microspheres and adhesive polymer are selected so that the amount of the microspheres is usually between 5 and 500 wt. parts, preferably between 20 and 400 wt. parts, per 100 wt. parts of the adhesive polymer. When the amount of the microspheres is less than 5 wt. parts, the above shape recovery effect may not be attained. When such an amount exceeds 500 wt. parts, the adhesion force tends to decrease.

Substrate Film

As the substrate film, any substrate film of conventional adhesive films may be used. For example, a paper sheet, a metal film, a plastic film and so on can be used. As the plastic, a synthetic polymer such as polyvinyl chloride, polyester, polyurethane, polyacrylate, polyolefin, etc. can be used. The thickness of the film is usually from 10 to 1500 $\mu$m.

In one embodiment, the thickness of the film is between 10 and 500 $\mu$m. The surface of the substrate film on which the adhesive layer is formed may be treated to improve the adhesion force between the substrate film and the adhesive layer.

The contact area of the adhesive layer is defined as a ratio of a contacted area between the adhesive layer and a flat surface of a glass plate, when the adhesive sheet is adhered to the flat surface of the glass plate using the procedure described below.

The flat surface of a glass plate, such as a slide glass, and the adhesive layer of the adhesive sheet are adhered, and pressed by reciprocating a roller of 2 kg in weight over the film one time to obtain a sample. The width of the adhesive sheet is 2 cm so that a linear pressure is 1 kg/cm. The roller is reciprocated in the longitudinal direction of the sheet.

When the glass plate is illuminated by a white light from the glass surface on which the adhesive film was not adhered, the reflected light is observed through a polarized light filter. Domains in which the projecting adhesive parts and the glass surface are in contact with each other are seen dark, while noncontact domains are seen white. The image is photographed, and a ratio of the total area of the contact domains to the area of the whole observed field (corresponding to the maximum possible contact area) is expressed as a "percentage", which is used as the "contact area rate". Such procedures can be carried out using an optical microscope equipped with a Polaroid camera. Here, the area of the whole observed field is usually about 1 cm². The surface roughness, Ra, of the used glass plate is 0.1 μm or less.

With the first embodiment, the observed contact area is usually 92% or larger, preferably 95% or larger, more preferably 98% or larger, after the adhered sheet is maintained at 25° C. for 48 hours and the uneven structure deforms.

Production of the Adhesive Sheet

The adhesive sheet of the first embodiment may be formed by applying a coating liquid for the adhesive layer on one or both of the surfaces of the substrate film, drying the applied coating liquid to form an adhesive layer, and pressing an uneven structural surface of a liner against the flat outer surface of the adhesive layer.

The coating liquid for the adhesive layer can be prepared by mixing the adhesive polymer, crosslinking agent, solvent and optional additives with a mixing apparatus such as a homomixer, a planetary mixer, etc. to disperse or dissolve all the components uniformly.

The prepared coating liquid is coated on the substrate film, and dried to form the adhesive layer. The coating liquid can be coated by any conventional coating means such as a knife coater, a roll coater, a die coater, a bar coater and the like. The coated liquid is usually dried at a temperature between 60 and 180° C. The drying time is usually between several ten seconds to several minutes.

Water or organic solvents can be used as solvents. Cosolvents, which are partly miscible with water, may be added. Examples of useful co-solvents are alkyleneglycol monoalkyl ether esters such as 3-methyl-3-methoxybutyl acetate.

The coating liquid may contain conventional additives such as a viscosity modifier, an anti-foaming agent, a leveling agent, a UV light absorber, an antioxidant, a pigment, an anti-fungus agent, etc. In addition, the coating liquid may contain inorganic particles (e.g. glass beads, etc.) or organic particles other than the elastic microspheres, insofar as the effects of the present invention are not impaired.

The liner is usually made of a paper sheet, a plastic film, or a laminate film thereof. For example, an embossing tool having a positive shape is pressed onto a flat surface of the film, and an uneven structure corresponding to the positive shape is transferred to the film surface. During embossing, the tool can be heated. The above positive shape has the same shape and size as the uneven structure to be formed on the adhesive surface.

Alternatively, a flowable material comprising plastics is poured on a mold having a positive structure, and solidified. Then, the mold is removed, and a liner having an uneven structure corresponding to the positive shape is obtained.

The uneven structural surface of the liner may be treated with, for example, silicones to impart releasability. When the plastics are polyolefins, the releasing treatment may be omitted.

Alternatively, a marketed adhesive sheet is purchased, and the original liner is replaced with the above uneven liner. Then, the adhesive layer and uneven liner are pressed to impart the uneven structure to the adhesive layer.

The adhesive sheet of the second embodiment can be produced by applying the above coating liquid containing elastic microspheres onto the uneven structural surface of the liner to form an adhesive layer, and then laminating a substrate film on the outer surface of the adhesive layer. The preparation of the coating liquid and coating method are the same as those described in the first embodiment. The liner can be the same as that used in the first embodiment.

The adhesive surface having an uneven structure may be formed by pressing an uneven liner onto an adhesive layer having a substantially flat adhesive surface, which has been formed on a substrate film.

Use of the Adhesive Sheet

The adhesive sheet of the present invention can be used as a decorative sheet and adhered to walls, floors and ceilings of buildings, signboards, etc.

Further embodiments are described in the following Examples.

EXAMPLES

Example 1

The adhesive sheet of this Example is that of the first embodiment.

A. Adhesive Sheet

SCOTCHCAL® JS1000A of Minnesota Mining and Manufacturing Company (3M) distributed by Sumitomo 3M Co. Ltd. of Tokyo, Japan, with a flat adhesive surface was used as the adhesive sheet. A flat liner was replaced with a liner having an uneven surface, which will be explained below, to form an uneven structure on the adhesive layer.

The adhesive layer of the above adhesive sheet was a layer formed by applying a coating composition comprising a crosslinked acrylic polymer and drying the coating composition. The layer had a thickness of 30 μm. The substrate film was a polyvinyl chloride film having a thickness of 50 μm.

B. Formation of Uneven Structure

On the adhesive surface of the adhesive sheet, a liner having an uneven structure was laminated while pressing to obtain an adhesive sheet having a liner.

The uneven structure of the liner consisted of a plurality of projections, which were formed continuously along lines forming a check pattern, and corresponding grooves on the adhesive surface. The height of the projections was 17 μm, and the maximum distance (at the roots of the projections) between adjacent projections was 1.2 mm. The depressed portions surrounded by the projections had a trapezoidal cross-sectional area in the vertical direction. Correspondingly, the projections on the adhesive layer had a trapezoidal cross-sectional area in the vertical direction.

C. Change of the Contact Area

On a flat surface of a slide glass of 76 mm in length, 26 mm in width and 1 mm in thickness (MICRO SLIDE GLASS HAKUROKUMA No. 1 manufactured by MATSUNAMI GLASS INDUSTRIES, Co., Ltd. of Japan), the adhesive layer of the adhesive sheet dimensions of about 5 cm×about 2 cm, from which the liner had been removed, was adhered and pressed by reciprocating a roller of 2 kg in weight and about 4.5 cm in width over the film one time to obtain a sample. Then, the contact area of the sample was measured by the above-described method. The surface roughness, Ra, of the slide glass was about 0.001 μm.

The contact area of the adhesive sheet of this Example was 73% just after the adhesion, and 100% after maintaining the adhesive sheet at 25° C. for 48 hours following the adhesion. After 48 hours at 25° C., the depressions on the substrate film corresponding to the depressions of the adhesive layer disappeared.

Bubble Escapability Test

After peeling off the liner, an adhesive sheet having dimensions of 10 cm×10 cm was placed on a flat acrylate plate, and squeezed by a squeezer towards the center of the adhesive sheet to gather bubbles. A roller of 2 kg was rolled over the bubbles several times, and a degree of bubble escape was observed. When all of the bubbles escaped, the film was ranked "GOOD". When a portion of the bubbles remained, the film was ranked "NO GOOD".

Comparative Example 1

An adhesive sheet was produced in the same manner as in Example 1 except that the coating liquid containing the same adhesive agent as that contained in the adhesive layer of the marketed adhesive sheet used in Example 1 was coated on an uneven structural surface of a liner. The coated liquid was dried, and then a polyvinyl chloride film was laminated to the adhesive surface.

The bubble escapability was "GOOD", but the depressions on the substrate film corresponding to the depressions of the adhesive layer did not disappear after 48 hours at 25° C. The contact area of the adhesive sheet of this Comparative Example was 81% just after the adhesion, and 91% after maintaining the adhesive sheet at 25° C. for 48 hours following the adhesion.

Example 2

An adhesive sheet of this Example was produced in the same manner as in Example 1 except that another marketed adhesive sheet having a flat adhesive surface "CONTROL TACK PLUS® 180-10 of 3M was used as an adhesive sheet.

The adhesive layer of this adhesive sheet contained a crosslinked acrylic polymer and glass microbeads, and had a thickness of 30 μm. The substrate film was a polyvinyl chloride film like the film used in the adhesive sheet of Example 1.

The bubble escapability was "GOOD", and the depressions on the substrate film corresponding to the depressions of the adhesive layer disappeared after 48 hours at 25° C. The contact area of the adhesive sheet of this Example was 91% just after the adhesion, and 100% after maintaining the adhesive sheet at 25° C. for 48 hours following the adhesion.

Example 3

The adhesive sheet of this Example is that of the second embodiment.

An aqueous emulsion type adhesive "E-1000" (manufactured by SOKEN CHEMICAL Co., Ltd. of Japan) was used as a liquid containing a matrix component comprising an adhesive polymer. The adhesive polymer consisted of butyl acrylate and acrylic acid in a weight ratio of 96:4.

The elastic microspheres were prepared by suspension polymerization using water as a medium according to the above-described method. The used monomer composition contained isooctyl acrylate and acrylic acid in a weight ratio of 96:4. The compression modulus was $7 \times 10^5$ dyn/cm$^2$. The compression modulus was measured using the method described below.

The solvent was removed from the suspension containing the elastic microspheres, and the microspheres were shaped in a cylinder form having a diameter of 5 mm and a length of 7 mm to obtain a test sample. The sample was attached to parallel plate jigs and then a compression modulus was measured using the measuring conditions described above (i.e., using a RSA II viscoelastic spectrometer (manufactured by RHEOMETRIX) at 20° C.).

The elastic microspheres were added to the emulsion containing the adhesive polymer in such amounts that a weight ratio of the adhesive polymer to the elastic microsphere was 80:20 (solid weights), and mixed to obtain a substantially uniform coating dispersion. The coating dispersion was applied on an uneven surface of a liner and dried to solidify the coating dispersion. On the dried layer, a polyvinyl chloride base substrate film having a thickness of 70 μm was laminated. An adhesive sheet consisting of a liner, an adhesive layer and a base substrate film was obtained. The thickness of the adhesive layer was 30 μm.

The bubble escapability was "GOOD", and the depressions on the substrate film corresponding to the depressions of the adhesive layer disappeared after 48 hours at 25° C.

For an appreciation of the scope of the invention, the claims follow.

What is claimed is:

1. An adhesive sheet comprising:
   (A) a flexible substrate film;
   (B) an adhesive layer in contact with at least one outer surface of the flexible substrate film, wherein the adhesive layer has an uneven outer surface having a positive structure shape opposite the flexible substrate film; and
   (C) a liner having a first uneven surface in direct contact with the uneven outer surface of the adhesive layer, wherein the first uneven surface of the liner has a negative structure shape that mirrors the positive structure shape of the adhesive layer,
   wherein the adhesive layer comprises a chemically crosslinked polymer formed from at least one adhesive polymer and at least one crosslinking agent, said adhesive layer having (i) an original outer surface shape prior to being deformed by the liner, and (ii) a shape memory within the adhesive layer, wherein the shape memory comprises a shape recovery force that causes the uneven outer surface of the adhesive layer to deform upon removal of the liner, such that the uneven outer surface of the adhesive layer deforms at a temperature of 25° C. so as to return substantially to the original outer surface shape within 48 hours of removing the liner.

2. The adhesive sheet of claim 1, wherein the at least one crosslinking agent the adhesive layer is present in an amount ranging from 0.01 to 5 parts by weight based on 100 parts by weight of the adhesive polymer.

3. The adhesive sheet of claim 1, wherein the adhesive sheet consists of the flexible substrate film, the adhesive layer, and the liner.

4. The adhesive sheet of claim 1, wherein the positive structure shape of the adhesive layer comprises (i) a plurality of projections and (ii) grooves surrounding the plurality of projections, wherein the grooves interconnect with one another and communicate with at least one outer edge of the adhesive layer; and the negative structure shape of the liner comprises (i) grooves which mirror and are in direct contact with the plurality of projections of the adhesive layer, and (ii) a plurality of projections which mirror and are in direct contact with the grooves of the adhesive layer.

5. The adhesive sheet of claim 1, wherein the original outer surface shape of the adhesive layer prior to contact with the liner is a substantially flat shape.

6. The adhesive sheet of claim 1, wherein the adhesive sheet is formed by a process comprising:
   forming the adhesive layer on an outer surface of the flexible substrate film; and
   contacting the original outer surface shape of the adhesive layer with the negative structure shape of the liner.

7. The adhesive sheet of claim 1, wherein the adhesive layer further comprises at least one additional polymer, wherein the at least one additional polymer does not have adhesive properties or tackiness at room temperature.

8. The adhesive sheet of claim 7, wherein the at least one adhesive polymer and the at least one additional polymer are crosslinked to one another using the at least one crosslinking agent.

9. An adhesive sheet comprising:
   (A) a flexible substrate film;
   (B) an adhesive layer in contact with at least one outer surface of the flexible substrate film, wherein the adhesive layer has an uneven outer surface having a positive structure shape opposite the flexible substrate film; and
   (C) a liner having a first uneven surface in direct contact with the uneven outer surface of the adhesive layer, wherein the first uneven surface of the liner has a negative structure shape that mirrors the positive structure shape of the adhesive layer,
wherein the adhesive layer has (i) an original outer surface shape prior to being deformed by the liner, and (ii) a shape memory within the adhesive layer, wherein the shape memory comprises a shape recovery force that causes the uneven outer surface of the adhesive layer to deform upon removal of the liner, such that the uneven outer surface of the adhesive layer deforms at a temperature of 25° C. so as to return substantially to the original outer surface shape within 48 hours of removing the liner.

10. The adhesive sheet of claim 9, wherein the adhesive layer comprises a chemically crosslinked polymer formed from at least one adhesive polymer and at least one crosslinking agent.

11. The adhesive sheet of claim 9, wherein the adhesive layer comprises at least one adhesive polymer and compacted or deformed elastic microspheres, wherein the compacted or deformed elastic microspheres result from contacting the original surface shape of the adhesive layer with the negative structure shape of the liner.

12. The adhesive sheet of claim 9, wherein the positive structure shape of the adhesive layer comprises (i) a plurality of projections and (ii) grooves surrounding the plurality of projections, wherein the grooves interconnect with one another and communicate with at least one outer edge of the adhesive layer; and the negative structure shape of the liner comprises (i) grooves which mirror and are in direct contact with the plurality of projections of the adhesive layer, and (ii) a plurality of projections which mirror and are in direct contact with the grooves of the adhesive layer.

13. The adhesive sheet of claim 9, wherein the original outer surface shape of the adhesive layer prior to contact with the liner is a substantially flat shape.

14. The adhesive sheet of claim 9, wherein the adhesive sheet is formed by a process comprising:
   forming the adhesive layer on an outer surface of the flexible substrate film; and
   contacting the original outer surface shape of the adhesive layer with the negative structure shape of the liner.

15. The adhesive sheet of claim 9, wherein the adhesive layer, prior to contact with the liner, comprises an adhesive polymer matrix and a substantially uniform distribution of elastic microspheres within the adhesive polymer matrix, and wherein the adhesive layer, after contact with the liner, comprises one or more compacted or deformed elastic microspheres.

16. The adhesive sheet of claim 15, wherein the elastic microspheres have a compressive modulus of from about $1 \times 10^4$ dyne/cm$^2$ to about $1 \times 10^6$ dyne/cm$^2$.

17. The adhesive sheet of claim 15, wherein the elastic microspheres have an average diameter as determined by a formulation:

$$\Sigma(d_i^4 \times n_i)/\Sigma(d_i^3 \times n_i)$$

wherein $d_i$ is a diameter ($\mu$m) of a microsphere having an i-th largest diameter, and $n_i$ is a number of microspheres having the diameter $d_i$
   wherein the average diameter ranges from 10 to 100 microns.

18. An adhesive sheet comprising:
   (A) a flexible substrate film;
   (B) an adhesive layer in direct contact with at least one outer surface of the flexible substrate film, wherein the adhesive layer has an uneven outer surface having a positive structure shape opposite the flexible substrate film; and
   (C) a liner having a first uneven surface in direct contact with the uneven outer surface of the adhesive layer, wherein the first uneven surface of the liner has a negative structure shape that mirrors the positive structure shape of the adhesive layer,
wherein the adhesive layer comprises at least one adhesive polymer and elastic microspheres, and at least a portion of the elastic microspheres are compacted or deformed from an original shape due to contact of the adhesive layer with the negative structure shape of the liner; and wherein the adhesive layer has (i) an original outer surface shape prior to being deformed by the liner, and (ii) a shape memory within the adhesive layer, wherein the shape memory comprises a shape recovery force that causes the uneven outer surface of the adhesive layer to deform upon removal of the liner, such that the uneven outer surface of the adhesive layer deforms at a temperature of 25° C. so as to return substantially to the original outer surface shape within 48 hours of removing the liner.

19. The adhesive sheet of claim 18, wherein the adhesive layer is only on one outer surface of the flexible substrate film.

20. The adhesive sheet of claim 18, wherein the adhesive sheet consists of the flexible substrate film, the adhesive layer, and the liner.

21. The adhesive sheet of claim 18, wherein the positive structure shape of the adhesive layer comprises (i) a plurality of projections and (ii) grooves surrounding the plurality of projections, wherein the grooves interconnect with one another and communicate with at least one outer edge of the adhesive layer; and the negative structure shape of the liner comprises (i) grooves which mirror and are in direct contact with the plurality of projections of the adhesive layer, and (ii) a plurality of projections which mirror and are in direct contact with the grooves of the adhesive layer.

22. The adhesive sheet of claim 18, wherein the adhesive layer, prior to contact with the liner, comprises an adhesive polymer matrix and a substantially uniform distribution of elastic microspheres within the adhesive polymer matrix, and wherein the adhesive layer, after contact with the liner, comprises one or more compacted or deformed elastic microspheres.

23. The adhesive sheet of claim 18, wherein the elastic microspheres have a compressive modulus of from about $1 \times 10^4$ dyne/cm$^2$ to about $1 \times 10^6$ dyne/cm$^2$.

24. The adhesive sheet of claim 18, wherein the original outer surface shape prior to contact with the liner is a substantially flat shape.

25. The adhesive sheet of claim 18, wherein the elastic microspheres are present in an amount ranging from 5 to 500 parts by weight based on 100 parts by weight of the adhesive polymer.

26. The adhesive sheet of claim 25, wherein the elastic microspheres are present in an amount ranging from 20 to 400 parts by weight based on 100 parts by weight of the adhesive polymer.

27. The adhesive sheet of claim 18, wherein the elastic microspheres have an average diameter as determined by a formulation:

$$\Sigma(d_i^4 \times n_i)/\Sigma(d_i^3 \times n_i)$$

wherein $d_i$ is a diameter ($\mu$m) of a microsphere having an i-th largest diameter, and $n_i$ is a number of microspheres having the diameter $d_i$ wherein the average diameter ranges from 10 to 100 microns.

28. The adhesive sheet of claim 27, wherein the elastic microspheres have an average diameter ranges from 20 to 80 microns.

* * * * *

UNITED STATES PATENT AND TRADEMARK OFFICE
CERTIFICATE OF CORRECTION

PATENT NO. : 6,630,218 B1
DATED : October 7, 2003
INVENTOR(S) : Abe, Hidetoshi

It is certified that error appears in the above-identified patent and that said Letters Patent is hereby corrected as shown below:

Title page,
Item [75], Inventor, delete "Tendo" and insert -- Tendo-ciy, Yamagata-pref. -- therefor.
Item [56], References Cited, FOREIGN PATENT DOCUMENTS, delete "WO WO97/20008   5/1997 ......... C09J/7/02"

Column 1,
Line 7, delete "oh" and insert -- on -- therefor.
Line 21, delete "an" and insert -- a -- therefor.

Column 2,
Line 21, delete "are" and insert -- is -- therefor.
Line 66, after "maintains" delete "-".

Column 10,
Line 2, delete "dyn/cm$^2$" and insert -- dyne/cm$^2$ -- therefor.
Line 55, after "agent" insert -- of --.

Signed and Sealed this

Twenty-eighth Day of June, 2005

JON W. DUDAS
*Director of the United States Patent and Trademark Office*